United States Patent [19]
Arsenault, Jr. et al.

[11] Patent Number: 5,474,218
[45] Date of Patent: Dec. 12, 1995

[54] ARTICLE CARRIER

[75] Inventors: Arthur V. Arsenault, Jr., Sterling Heights; Joseph E. Kubina, Oakland; Gerard J. Kmita, Allen Park, all of Mich.

[73] Assignee: Chrysler Corporation, Highland Park, Mich.

[21] Appl. No.: 279,615

[22] Filed: Jul. 25, 1994

[51] Int. Cl.⁶ .................................. B60R 9/05; B60R 9/00
[52] U.S. Cl. ...................... 224/316; 224/309; 296/180.1
[58] Field of Search .................................. 224/309, 316, 224/322, 323, 324, 917, 326; 49/489.1, 475.1; 296/180.1, 93, 209

[56] References Cited

U.S. PATENT DOCUMENTS

| | | | |
|---|---|---|---|
| 2,684,508 | 7/1954 | Meyers et al. | 49/489.1 |
| 3,213,584 | 10/1965 | Bush | 49/489.1 |
| 3,724,730 | 4/1973 | Olsen et al. | 224/42.1 D |
| 4,015,760 | 4/1977 | Bott | 224/42.1 D |
| 4,432,478 | 2/1984 | Bott | 224/324 |
| 4,754,905 | 7/1988 | Bott | 224/326 |
| 4,911,348 | 3/1990 | Rasor et al. | 224/321 |
| 4,911,349 | 3/1990 | Miller | 224/326 |
| 4,953,907 | 9/1990 | Sugita | 296/93 |
| 5,008,787 | 2/1991 | Gross | 296/93 |
| 5,009,462 | 4/1991 | Katcherian | 296/93 |
| 5,032,444 | 7/1991 | Desir, Sr. | 296/93 |
| 5,067,644 | 11/1991 | Coleman | 224/917 |
| 5,195,669 | 3/1993 | Duemmler | 224/315 |
| 5,207,365 | 5/1993 | Bott | 224/316 |
| 5,264,270 | 11/1993 | Agrawal | 296/93 |
| 5,282,560 | 2/1994 | Ozog | 224/316 |
| 5,311,711 | 5/1994 | Desir, Sr. | 296/93 |

FOREIGN PATENT DOCUMENTS

| | | | |
|---|---|---|---|
| 3528569 | 2/1987 | Germany | 296/180.1 |
| 3602198 | 4/1987 | Germany | 296/93 |
| 2219338 | 12/1989 | United Kingdom | 296/93 |

*Primary Examiner*—Henry J. Recla
*Assistant Examiner*—Gregory M. Vidovich
*Attorney, Agent, or Firm*—Christopher A. Taravella

[57] ABSTRACT

A vehicle roof rack article carrier having a protective rubber insert strip secured in a channel formed in each cross rail of the roof rack. A leading edge portion is formed on the insert strip so as to curve downwardly along an arcuate upper front portion of the cross bar, terminating in a down-turned rounded edge, to thereby provide a virtually wind noise resistant roof rack.

3 Claims, 2 Drawing Sheets

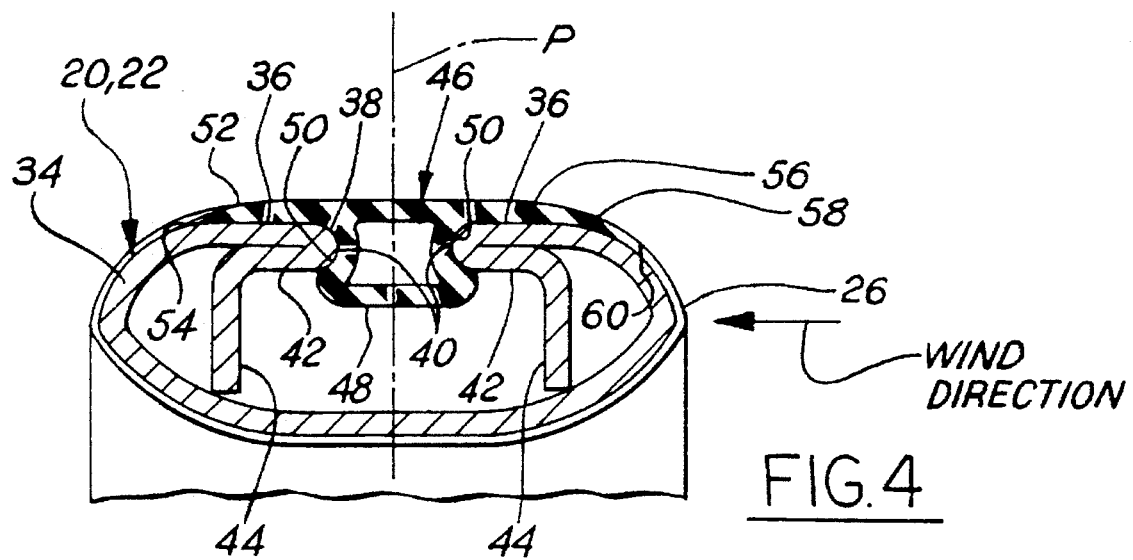
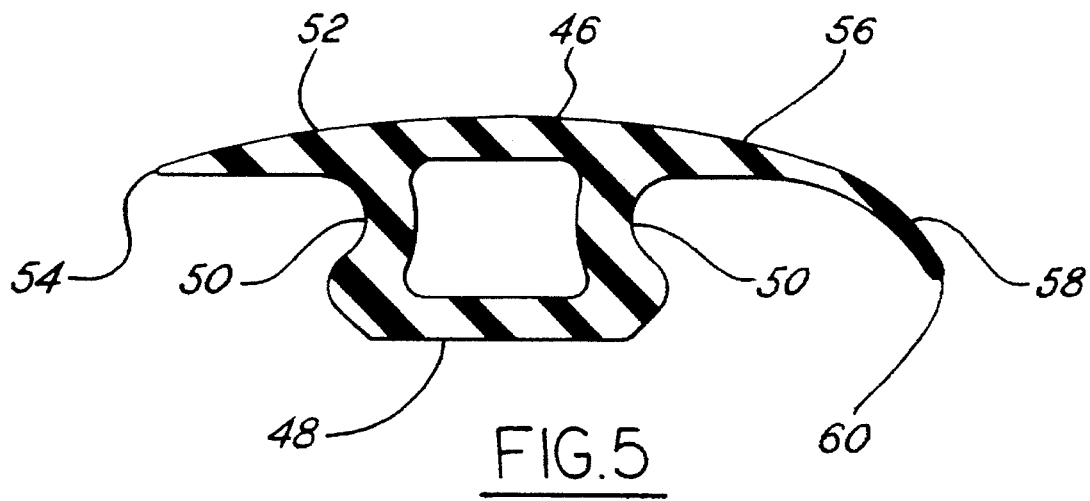

5,474,218

ARTICLE CARRIER

TECHNICAL FIELD

This invention relates generally to article carriers for vehicle roofs and, more particularly, to such carriers having rubber bumper strips mounted in the carrier cross rails and which are functional and noise-free when the vehicle is moving at mid range to higher speeds.

BACKGROUND ART

The following patents disclose article carriers for vehicle roofs, which have protective plastic or rubber bumper strips mounted in channels formed in the cross rails of the carriers: Bott U.S. Pat. No. 4,015,760; Bott U.S. Pat. No. 4,754,905; Rasor et al U.S. Pat. No. 4,911,348; Miller U.S. Pat. No. 4,911,349; Duemmler U.S. Pat. No. 5,195,669; and Bott U.S. Pat. No. 5,207,365.

Except for U.S. Pat. No. 5,195,669, each of the above listed patents disclose plastic or rubber bumper strips which have vertically oriented blunt leading edges extending above the upper surface of the carrier cross rail. The rubber cover strip of U.S. Pat. No. 5,195,669 mounts on top of a flat surface and in a channel, such that its arcuate-shaped top surface ends in feathered edges lying on the flat surface. Each of the U.S. Pat. Nos. 4,754,905; 4,911,348; 4,911,349; and U.S. Pat. No. 5,207,365 have their bumper strip front and rear end portions mounted in recesses formed in the cross rails.

Olsen et al U.S. Pat. No. 3,724,730 discloses a car top luggage carrier having plugs mounted in openings formed in the closure end elements of longitudinal rails, with an annular feathered lip lying on the outer surface of the end elements.

DISCLOSURE OF THE INVENTION

A general object of the invention is to provide an improved article carrier for a vehicle roof, with efficient and wind-noiseless rubber bumper strips secured in channels formed in the cross rails of the carrier.

Another object of the invention is to provide a vehicle roof article carrier having rubber bumper strips secured in channels formed in the cross bars of the carrier, wherein the rubber strips are specially formed to eliminate vertically oriented blunt ends along the leading edges thereof, which tend to create bothersome wind noises or whistles when the vehicle is travelling at relatively high speeds.

A further object of the invention is to provide a vehicle roof article carrier having a protective rubber strip snapped into a channel formed in each cross rail of the carrier, with a leading end portion formed on the strip which curves downwardly along an arcuate upper front portion of the cross rail bar, terminating in a down-turned rounded edge, so as to provide a virtually wind noise resistant bumper strip.

These and other object and advantages of the invention will become more apparent when reference is made to the following drawings and the accompanying description.

BRIEF DESCRIPTION OF THE DRAWINGS

FIG. 4 is a cross-sectional view taken along the plane of the line 4—4 of FIG. 3, and looking in the direction of the arrows; and FIG. 5 is an enlarged cross-sectional view of a portion of the FIG. 4 structure.

BEST MODE FOR CARRYING OUT THE INVENTION

Figure 1:
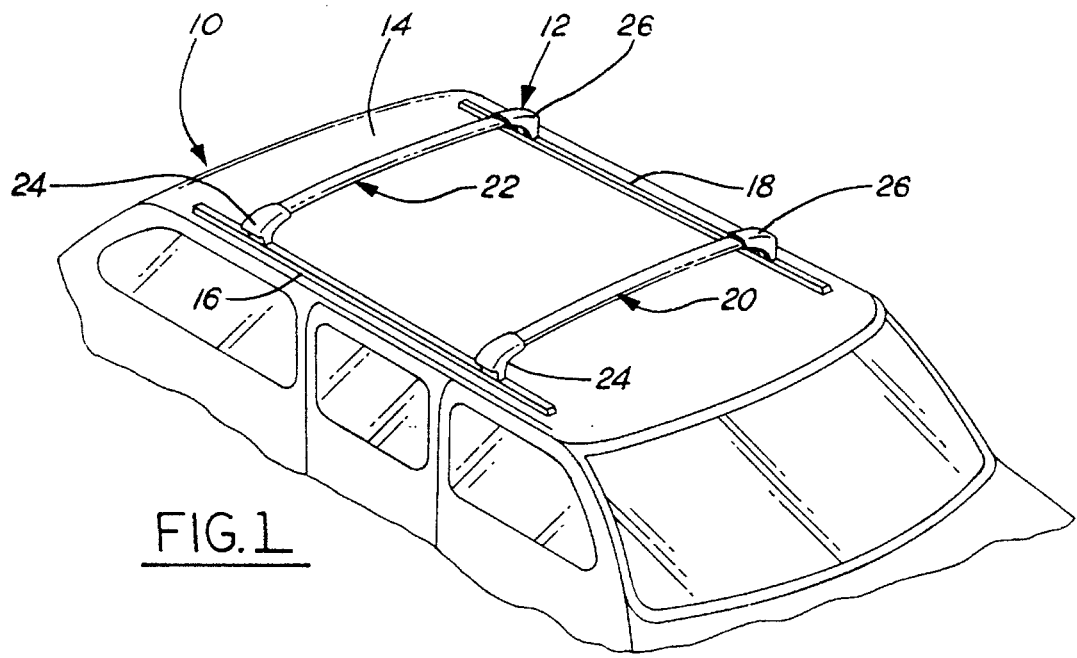
FIG. 1 is a fragmentary perspective view of a vehicle having a roof rack article carrier mounted thereon, embodying the invention.
Figure 3:
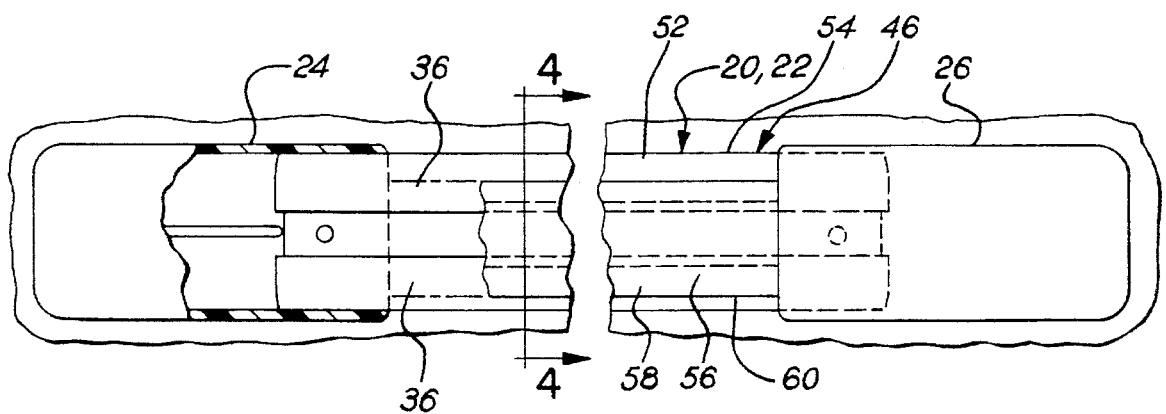
FIG. 3 is an enlarged plan view in partial cross-section of a cross bar of the article carrier embodying the invention.
Figure 2:
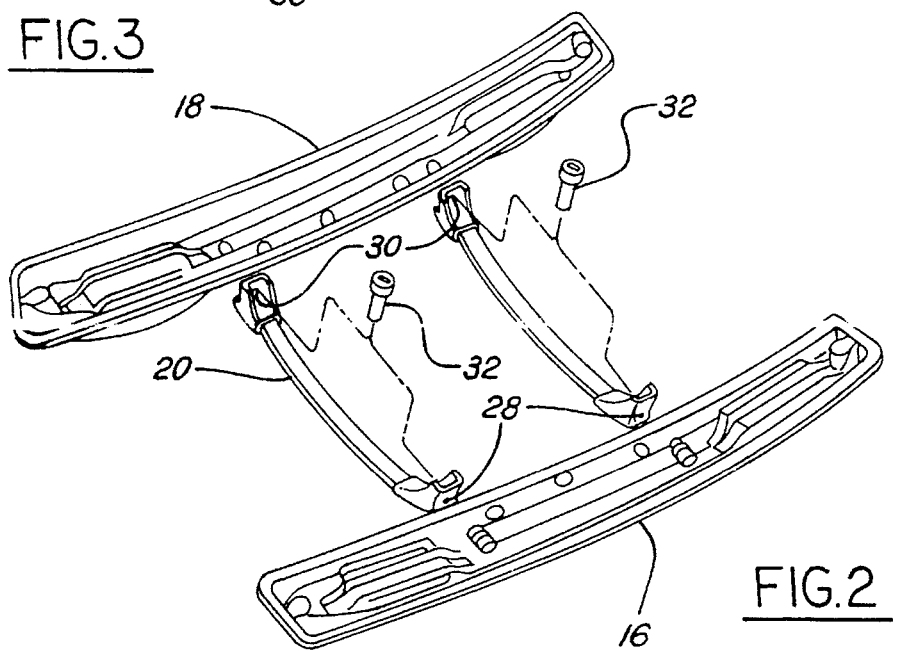
FIG. 2 is a bottom view of the longitudinal and cross rails of the article carrier illustrating the interconnection thereof.

Referring now to the drawings in greater detail, FIGS. 1 and 2 illustrate a vehicle 10 having a roof rack article carrier 12 mounted on the roof 14 thereof. The article carrier 12 includes two longitudinal mounted side rails 16 and 18 secured adjacent the oppositely disposed sides of the roof 14, and two cross forward and aft rails 20 and 22 respectively, secured between the respective front and rear end portions of the longitudinal rails 16 and 18. The cross rails are formed symmetrical about a vertically disposed transverse plane of symmetry indicated by construction line P.

Each cross rail 20 and 22 includes mounting brackets 24 and 26 at the respective ends thereof, having respective holes 28 and 30 formed therein for being secured by screws 32 against the respective end portions of the side rails 16 and 18.

As shown in FIG. 4, each cross rail 20 and 22 is formed as a tube 34 having a substantially oval cross sectional shape, with a flat upper surface 36 having a channel 38 formed along the center thereof. Each edge 40 of the channel 38 is rounded by virtue of a folded-back segment 42 terminating in a downwardly extending end segment 44.

A contoured rubber insert strip 46 is adapted to be mounted on the flat upper surface 36 to provide a non-scuffing protective bumper surface for any articles mounted thereon. A hollow flexible protrusion 48 extends downwardly from the center of the strip 46, having concave sides 50 adapted to match the rounded edges 40 of the channel 38 when the protrusion 48 is snapped into the channel. In its installed position the protrusion 48 is symmetrically disposed about the plane of symmetry of the cross rail 20, indicated by construction line P.

As shown in FIG. 5, the strip 46 has a trailing end portion 52 which becomes progressively thinner terminating with a substantially feathered trailing edge 54, and a leading edge portion 56 which also becomes progressively thinner until a predetermined thickness is attained, and continuing such attained thickness in an arcuate segment 58, curving downwardly to terminate in a rounded end 60. As such, the leading end portion 56 extends beyond the flat surface 36 and the arcuate segment 58 conforms to the underlying upper arcuate portion of the oval shape of the cross rail. As such, the insert is non-symmetrical and, hence, non-reversible, with specific leading and trailing edges.

Wind noise is virtually eliminated by two separate fluid dynamics phenomenon that are modified or eliminated due to the resulting exterior profile of the cross bar that is generated when the rubber insert strip is installed. First, by virtue of closing the flat upper surface 36 of the cross rail having channel 38, the addition of the rubber insert strip eliminates tangential air flow past the open cavity and prohibits narrow band frequency resonance. This results in a wind noise reduction in the 500 Hz frequency range. Second, the modification to the forward (windward) edge of the cross bar as a result of the addition of the rubber insert strip, reduces the frequency of the periodic shedding vortices. By altering the forward cross sectional profile of the cross bar, the frequency of periodic shedding vortices is lessened, resulting in a lower transverse force applied to the cross bar. This results in a wind noise reduction in the 1000 Hz frequency range.

By virtue of the downwardly curved segment 58 and rounded leading edge 60, wind noise resulting from air flowing therepast is virtually eliminated.

INDUSTRIAL APPLICABILITY

It should be apparent that the invention provides an efficient, wind noise resistant, protective bumper strip for a cross bar of a vehicle roof article carrier, wherein vertically oriented blunt leading edges are eliminated.

While but one embodiment of the invention has been shown and described, other modifications thereof are possible within the scope of the following claims.

What is claimed is:

1. A protective resilient bumper strip for an article carrier for a vehicle roof, the article carrier including oppositely disposed longitudinal rails, and front and rear substantially oval shaped cross rails except for each of said cross rails having a substantially flat upper surface, each of said cross rails being mounted to and between each of the longitudinal rails, with a channel formed in each of the cross rails substantially along the length thereof at a center portion of the flat upper surface defining upper forward and upper rear flat surfaces adjacent said channel, each channel receiving one said protective resilient bumper strip therein, each said bumper strip having a length substantially equivalent to that of a respective channel and having a lower projection extending substantially along the length of said strip adapted to be snapped into said respective channel and leading and trailing side edge portions of said bumper strip extending forwardly and rearwardly of said projection to overlap the forward and rear upper flat surfaces of said cross rail, respectively, the trailing side edge portion adapted to overlie and conform to the upper rear flat surface of said cross rail and terminating in a substantially feathered edge, said leading side edge portion adapted to overlie and conform to the upper forward flat surface of said cross rail and further having a downwardly curving arcuate segment extending therefrom terminating in an exposed rounded edge which is adapted to overlie and conform to an upper front portion of the oval shaped cross rail forwardly of the upper flat surface to thereby reduce wind noise with respect to said article carrier.

2. The protective resilient bumper strip described in claim 1, wherein said trailing side edge portion is formed progressively thinner from said projection to said substantially feathered edge, and said leading side edge portion is formed progressively thinner from said projection to said downwardly curving arcuate segment.

3. The protective resilient bumper strip described in claim 2, wherein said downwardly curving arcuate segment is a constant thickness.

* * * * *